United States Patent Office 3,563,080
Patented Feb. 16, 1971

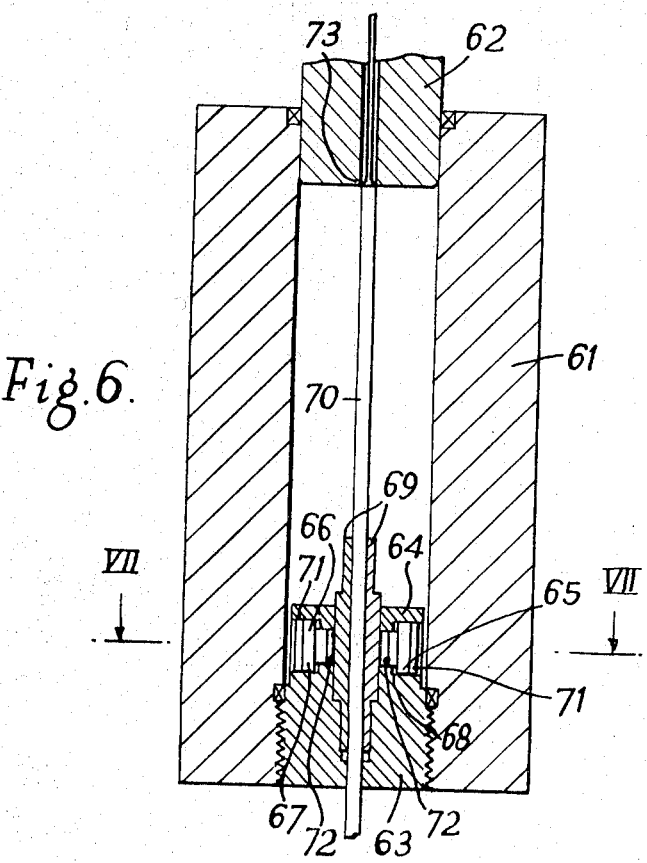
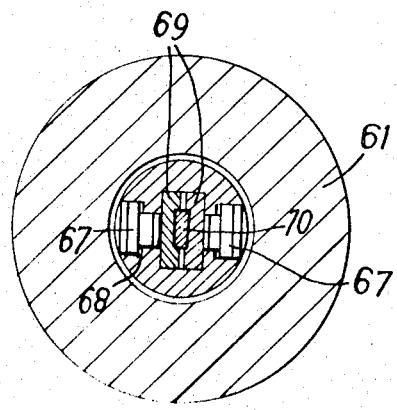

3,563,080
HIGH PRESSURE CONTAINERS FOR CYCLICALLY VARYING PRESSURES
John Malcolm Alexander and Bela Lengyel, London, England, assignors to National Research & Development Corporation, London, England
Filed Aug. 11, 1967, Ser. No. 660,056
Claims priority, application Great Britain, Aug. 15, 1966, 36,455/66
Int. Cl. B21c *27/00*
U.S. Cl. 72—272                        8 Claims

ABSTRACT OF THE DISCLOSURE

A high pressure container, for example for hydrostatic extrusion has a plunger for generating high hydrostatic pressure in the container and also has a movable wall portion defined by a surface of a floating movable member. An opposite surface of the floating member of larger area forms a movable wall surface in a lower pressure chamber. Consequently, the pressure in the lower pressure chamber is always less than but proportional to the pressure in the high pressure chamber. The lower pressure thus generated is applied around the outer cylindrical wall surface of the high pressure chamber. In this way, tensile hoop stresses in the cylindrical wall can be eliminated throughout a working cycle within the high pressure chamber. The life of the high pressure chamber is increased since the risk of fatigue failure is reduced.

---

This invention relates to high pressure containers for cyclically varying pressures, which may for example be of the order of 150 or even 220 tons per square inch at the peak of the cycle.

High pressures are required in many industrial processes. One example of such a process involving a particularly high value of peak pressure is the cyclic hydrostatic extrusion process described in our co-pending application Ser. No. 535,925.

In view of the high values of circumferential and radial compressive stresses in the region of the inner surface of the container wall, it is desirable to use a lining of a material having a high compressive strength examples of which are some ceramic materials and high speed steels. Such materials however tend to be very brittle and are unable to withstand high tensile stresses particularly when the latter are impressed cyclically in which case the working life is further reduced by fatigue failure.

In order to overcome this problem, it has already been proposed to surround the container with a chamber in which a constant pressure is maintained equal to the peak working pressure within the container. This ensures that there are no tensile hoop stresses in the container wall at any time in a working cycle. However, when the pressure within the container is at its lowest in the working cycle, in many cases zero, the container wall has to withstand the very high external pressure with the result that the compressive hoop stress in the region of the inner wall surface is very high while the radial compressive stress is low or zero. The compressive strength of the material forming the inner wall of the container thus sets a limit to the maximum pressure which can be applied to the outside of the container wall and thus to the working pressure within the container.

It is accordingly one object of the present invention to provide a container structure of relatively economic cost in which this problem may be overcome without shortening the fatigue life of the container structure.

In accordance with one aspect of the invention there is provided a high pressure container structure for cyclically varying pressures comprising a thick container wall, preferably of wall thickness at least one half the internal radius of the wall, the container wall being surrounded by an outer wall defining an outer chamber surrounding the container wall, and means for generating a fluid pressure in the outer chamber which is less than but proportional to the pressure within the container wall in such a manner that the tensile stress in the said container wall is reduced or eliminated throughout a cyclical pressure variation within the container wall. With this arrangement, the circumferential hoop stress in the region of the inner surface of the container wall can be kept to a comparatively small compressive value throughout a working cycle. As will be shown below, in the case of a cylindrical container wall, if the pressure within the cylindrical wall is $p_i$, and $p_o$ is the pressure in the outer chamber, then there will be no tensile stresses in the cylindrical wall if $$p_o \geq \tfrac{1}{2}\left(1+\frac{1}{K^2}\right)p_i$$

where K is the ratio of the outer radius of the cylindrical wall to the inner radius. Thus for example where $K=2$, $p_o$ is ⅝ $p_i$ and the outer wall of the outer chamber has thus to withstand an appreciably lower cyclically varying pressure than the inner cylindrical wall. It will often be found that this outer wall can be of conventional high pressure container construction. Where desired however the outer wall of the outer chamber may itself be surrounded by a further chamber in which a constant high pressure $p_f$ is maintained. In order to ensure that there are no tensile stresses in the said outer wall, the value $p_f$ may be chosen such that:

$$p_f \geq \tfrac{1}{2}\left(1+\frac{1}{K'^2}\right)p_o \qquad (A)$$

where K' is the ratio of the outer to the inner radius of the said outer wall in the case where the outer wall is cylindrical.

Advantageously, a wall portion of the inner cylinder is formed by a surface of a movable member which presents a second surface which forms a wall portion of the outer chamber, the ratio of the projections of the areas presented to the inner and outer chambers being equal to the required value of the ratio $p_i:p_o$.

Where the container is to be used for cyclical hydrostatic extrusion as described in our co-pending application referred to above, the pressure in the outer chamber may be used to operate a clamping device for preventing back extrusion of the workpiece. Alternatively or additionally, the extrusion die may be mounted in the said movable member, in which case the clamping means if required for the cyclical hydrostatic extrusion process may be accommodated in a plunger member forming another movable wall of the container.

In accordance with a second aspect of the present invention, the relatively lower pressure generated by the said second surface of the movable member may be applied to an extrudate emerging from the extrusion die so as to provide a back pressure to prevent fracture or disintegration of the extrudate in the case where the latter is of brittle material. The said relatively lower pressure may then also be applied to the outside of the container wall as described above.

In all the constructions referred to above in accordance with the various aspects of the invention, the length of travel of the said movable member should be sufficient to accommodate the compression of the fluid such as liquid within the container wall and also to allow for the changes in volume if necessary in the case where material is being extruded from the container.

According to a third aspect of the present invention there is provided a high pressure container structure for cyclically varying pressures comprising a thick container wall preferably of wall thickness at least one half the internal radius of the wall, an outer wall defining an outer chamber surrounding the outer wall, and means for maintaining a high steady fluid pressure in the said outer chamber, the said steady pressure being less than the peak working pressure within the container wall but being greater than half the said peak working pressure and being sufficient to ensure that there are substantially no tensile circumferential stresses in the container wall throughout the working pressure cycle. In this case, a maximum value for peak working pressure is set by the compressive strength of the material forming the inner surface of the container wall. However, this value is somewhat higher than was obtainable in the previously proposed construction referred to above as a result of the pressure in the outer chamber being comparatively reduced. In the case of a cylindrical container wall, the inequality A above would apply if $p_o$ is the peak working pressure with the container and $p_f$ is the steady pressure in the outer chamber.

Embodiments of the various aspects of the present invention will now be described by way of example with reference to the accompanying drawings, in which:

FIG. 6 is a view corresponding to FIG. 4 of a modified cyclical hydrostatic extrusion apparatus;

FIG. 7 is a cross section on the line VII—VII of FIG. 6; and

Figure 1:
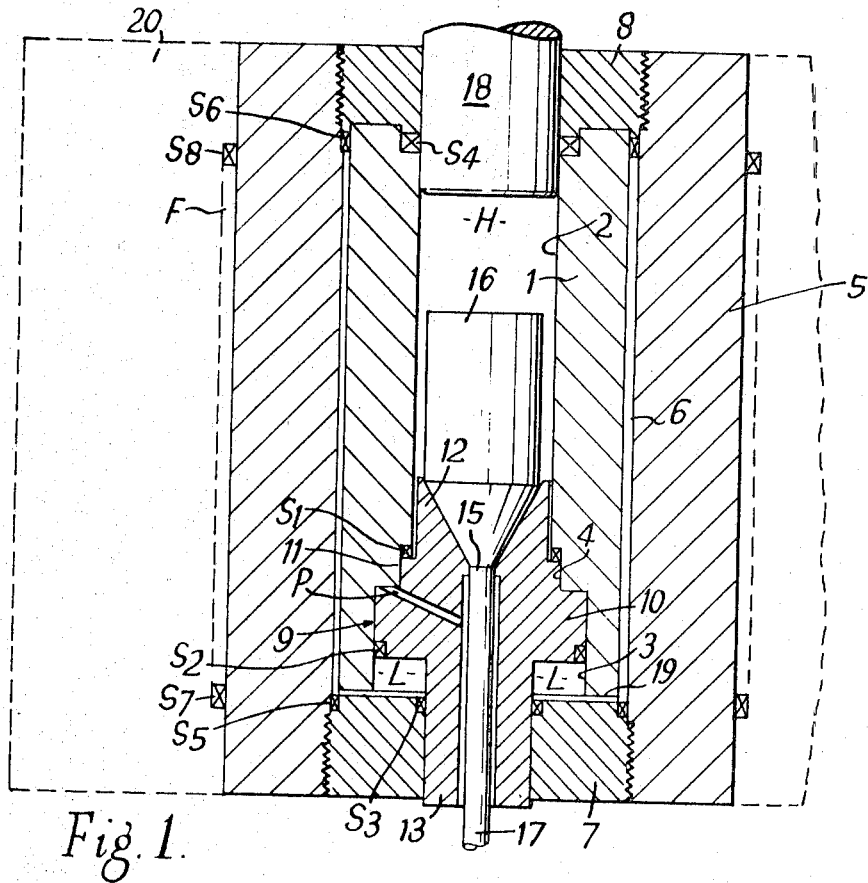
FIG. 1 is a diagrammatic axial sectional view of a non-continuous extrusion apparatus for effecting a large reduction in the cross sectional area of a billet.

The apparatus shown in FIG. 1 comprises a cylindrical container wall 1 which for the greater part of its length has a constant diameter bore 2 but at its lower end has a cylindrical bore 3 of larger diameter than the bore 2, the bores 2 and 3 being separated by a rebate 4 of intermediate diameter.

An outer cylindrical wall 5 surrounds the container wall 1 with a small clearance to define an outer annular chamber 6. The outer wall 5 is of greater axial length than the container wall 1 and it two ends are internally threaded to receive annular end members 7 and 8.

A moveable member 9 has a large diameter portion 10 slidable in the bore 3, a smaller diameter portion 11 slidable in the rebate 4, a still smaller diameter portion 12 slidable through a seal $S_1$ mounted at the lower end of the bore 2 and a lower stem portion 13 slidable in the lower end member 7. The moveable member 9 is hollow and defines at its upper end an extrusion die 15 for effecting a large reduction in the cross section of a billet such as 16 to form an extrudate such as 17. A passage P connects the space between the seals $S_1$ and $S_2$ with the interior of the moveable member, and thus with the atmosphere, for the escape of any liquid which leaks past the seals $S_1$ or $S_2$.

A plunger 18 is slidable as a close sliding fit through the upper end member 8. A large axial force can be applied to the plunger 18 in the downwards direction by a hydraulic press (not shown).

The moveable member 9 thus separates a high pressure chamber H within the bore 2 from an annular lower pressure chamber L in the bore 3, the cross sectional area of the chamber L between the bore 3 and the stem 13 being greater than the cross sectional area of the bore 2. Radial passages 19 at the lower end of the cylindrical container wall 1 connect the chamber L with the outer chamber 6.

The relative cross sectional areas of the chambers H and L are chosen such that when the plunger 18 is driven downwards in the bore 2, with the bore 2, chamber L and outer chamber 6 filled with liquid, the moveable member 9 causes the pressure to be generated in the chamber L and the outer chamber 6 which is sufficient to ensure that there are no tensile circumferential stresses in the cylindrical wall 1 despite a very high value of pressure in the chamber H.

In the case of a closed-ended cylindrical container subjected to both internal and external pressures, the ends of the chamber being secured to the cylindrical wall of the chamber, the elastic stresses are as follows:

$$\sigma_\theta = \frac{-p_o K^2 + p_i}{K^2 - 1} - \frac{p_o - p_i}{K^2 - 1}\left(\frac{r_i}{r}\right)^2 K^2 \quad (1)$$

$$\sigma_r = \frac{-p_o K^2 + p_i}{K^2 - 1} + \frac{p_o - p_i}{K^2 - 1}\left(\frac{r_i}{r}\right)^2 K^2 \quad (2)$$

$$\sigma_z = \frac{-p_o K^2 + p_i}{K^2 - 1} \quad (3)$$

Where $K = r_o/r_i$
$p_i$ = pressure on the inside surface of the container wall
$p_o$ = pressure on the outside surface of the container wall
$r_i$ = radius of the inside surface of the container wall
$r_o$ = radius of the outside surface of the container wall
$r$ = radius to any intermediate surface of the container wall
$\sigma_\theta$ = circumferential or hoop stress
$\sigma_r$ = radial stress
$\sigma_z$ = axial stress At the bore $r = r_i$: it can be seen from Equations 1, 2 and 3 that the stresses at the bore become $$\sigma_\theta = \frac{-2p_o K^2 + p_i(1 + K^2)}{K^2 - 1} \quad (1a)$$

$$\sigma_r = -p_i \quad (2a)$$

$$\sigma_z = \frac{-p_o K^2 p_i}{K^2 - 1} \quad (3a)$$

At the outside of the container $$\frac{r_i}{r} = \frac{1}{K}$$

and the stresses are $$\sigma_\theta = \frac{2p_i - p_o(1 + K^2)}{K^2 - 1} \quad (1b)$$

$$\sigma_r = -p_o \quad (2b)$$

$$\sigma_z = \frac{-p_o K^2 + p_i}{K^2 - 1} \quad (3b)$$

To make $\sigma_\theta$ zero at the bore it is apparent from Equation 1a that $$p_o = \frac{1 + K^2}{2K^2} p_i \quad (4)$$

so that the stresses in the bore then become $$\sigma_\theta = 0 \quad (1c)$$

$$\sigma_r = -p_i \quad (2c)$$

$$\sigma_z = \frac{-p_i}{2} \quad (3c)$$

The stresses at the outside of the container become $$\sigma_\theta = -\frac{K^2-1}{2K^2} p_i \quad (1d)$$

$$\sigma_r = -p_o = -\frac{K^2+1}{2K^2} p_i \quad (2d)$$

$$\sigma_z = -\frac{p_i}{2} \quad (3d)$$

If the cylinder is open ended, that is the end members are not secured to the cylindrical wall, there would be no axial stresses anywhere in the cylindrical wall but the circumferential and radial stresses will be those calculated above.

It can be seen from Equations 1c, 2c, 3c, 1d, 2d, 3d that if the ratio of the pressures in the chambers H and L is kept to value given by Equation 4, namely:

$$\frac{p_o}{p_i} = \frac{1+K^2}{2K^2}$$

there will be no tensile circumferential stress anywhere in the cylindrical wall 1 whatever the value of the pressure $p_i$ in the chamber H. This is achieved by making the ratio of the effective cross sectional areas of the chambers H and L equal to $$\frac{1+K^2}{2K^2} = \frac{1}{2}\left(1 + \frac{1}{K^2}\right)$$

Since K must be greater than 1, the value of $p_i > p_o > \frac{1}{2} p_i$

If $K=1.5$, the ratio $p_o/p_i = .72$. If $K=2$, the ratio $p_o/p_i = 5/8$. If $K=10$, the ratio $p_o/p_i = 101/200$. Thus the ratio $p_o/p_i$ rapidly approaches $\frac{1}{2}$ with increasing value of K and little further advantage is obtained with values of K much greater than 2.

The arrangement described above effectively transfers the fatigue problem from the cylindrical container wall 1 to the outer cylindrical wall 5 but with an appreciably lower cyclically varying pressure in the outer chamber 6 than obtained in the chamber H. Moreover the circumferential stress is always zero at the inner wall 2 and cyclically varies between 0 to $$-\frac{K^2-1}{2K^2} p_i$$

(compressive) at the outer surface of the container 1. The radial stress is also always compressive cycling between 0 to $-p_i$ at 2 and between 0 to $$-\frac{K^2+1}{2K^2} p_i$$

at the outer surface of the container 1. The largest of these is $p_i$, clearly smaller than $$-\frac{K^2+1}{K^2-1} p_i$$

the compressive circumferential stress at the bore of the container 1, obtaining when the outer pressure is constant at $$p_o = \frac{1+K^2}{2K^2} p_i$$

and the internal pressure is zero. For example, if $K=2$ the maximum compressive circumferential stress for the design with static supporting fluid pressure becomes $$-\frac{K^2+1}{K^2-1} p_i = -\frac{5}{3} p_i$$

which is substantially larger than the maximum compressive radial stress in the present design, $-p_o$. Thus the risk of compressive failure at the inner wall of the bore 2 is greatly reduced.

Since the values of the cyclically varying pressure in the outer chamber 6 are appreciably lower than those in the chamber H, it will in many cases be possible to make the outer cylindrical wall 5 of conventional high pressure construction. Where however the peak working pressure $p_i$ in the chamber H is so high that there would be a risk of tensile fatigue failure of the outer cylindrical wall 5, the latter may be surrounded by a further chamber F formed in a further cylindrical member 20. The interior of the chamber F would then be maintained at a constant pressure $p_f$ which may be sufficient either to eliminate all tensile stresses in the wall of the outer cylinder 5, in which case $$\frac{p_f}{p_o} = \frac{1}{2}\left(1 + \frac{1}{K'^2}\right)$$

or else to reduce the tensile circumferential stresses to an acceptable value.

In view of the high pressure obtaining in all parts of the apparatus shown in FIG. 1 during a working cycle, all joints between components are sealed by appropriate high pressure seals $S_1$ to $S_8$, the seals $S_1$ to $S_4$ allowing relative sliding movement between the two adjacent parts whereas the seals $S_5$ to $S_8$ may be static seals.

Figure 2:
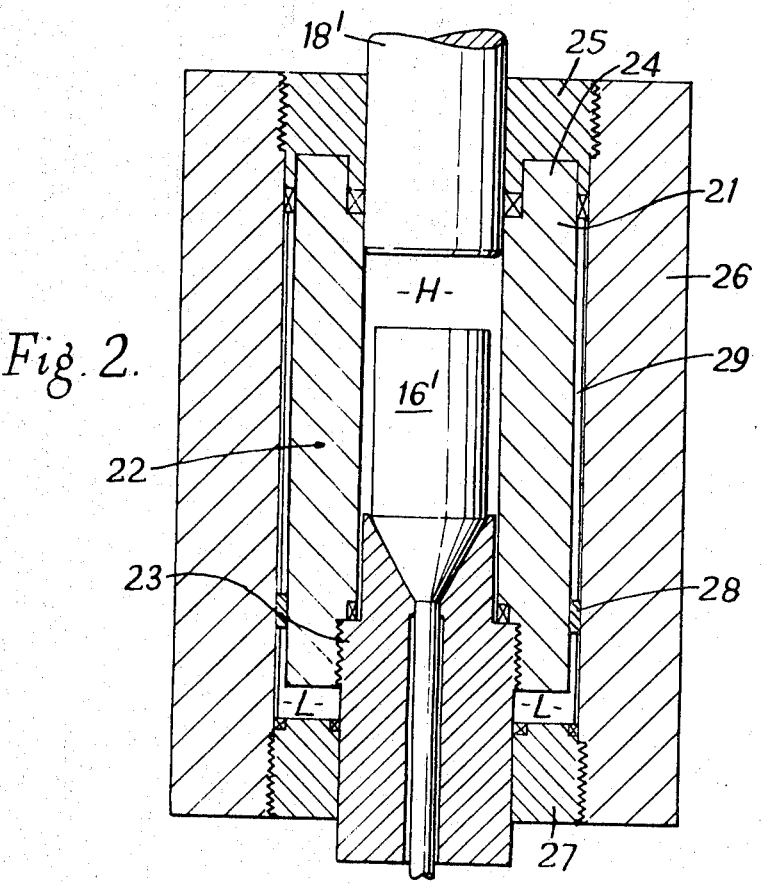
FIG. 2 is a view corresponding to FIG. 1 of a modified construction.

The embodiment shown in FIG. 2 is basically similar to that shown in FIG. 1 with the exception that the cylindrical wall 2 forms part of the moveable member assembly 22 which in this case includes a generally cylindrical hollow extrusion die member 23 which is screwed into the lower end of the cylindrical wall 22. The upper end of the cylindrical wall 21 carries an annular extension 24 which is a sliding fit in a corresponding annular recess in an upper end member 25 which is screwed into one end of an outer cylindrical wall 26. The other end of the outer wall 26 is threaded to receive an end member 27 through which the extrusion die member 23 is slidable.

In the region of its junction with the die member 23, the cylindrical wall 21 passes through a ring 28 fixed to the inner wall of the outer cylinder 26. The cylindrical wall 21 is a sliding fit in the ring 28. The ring 28 is formed with one or more passages to ensure that the pressure generated in the annular chamber L between the end of the cylindrical wall 21 and the end member 27 is transmitted to the full length of the clearance 29 between the inner and outer cylindrical walls 21 and 26.

A plunger 18' similar to the plunger 18 of FIG. 1 extends slidably through the end member 25 into the interior of the cylindrical wall 21 and enables a sufficiently high hydrostatic pressure to be generated within the chamber H in the interior of the cylindrical wall 21 to extrude a billet 16' through the die member 23.

The ratio of the areas of the annular end wall of the cylindrical wall 21 in the chamber L to the cross sectional area of the plunger 18' is equal to $$\frac{1+K^2}{2K^2}$$

Thus throughout a working cycle the circumferential stress in the region of the inner wall of the cylindrical member 1 is substantially zero.

Figure 3:
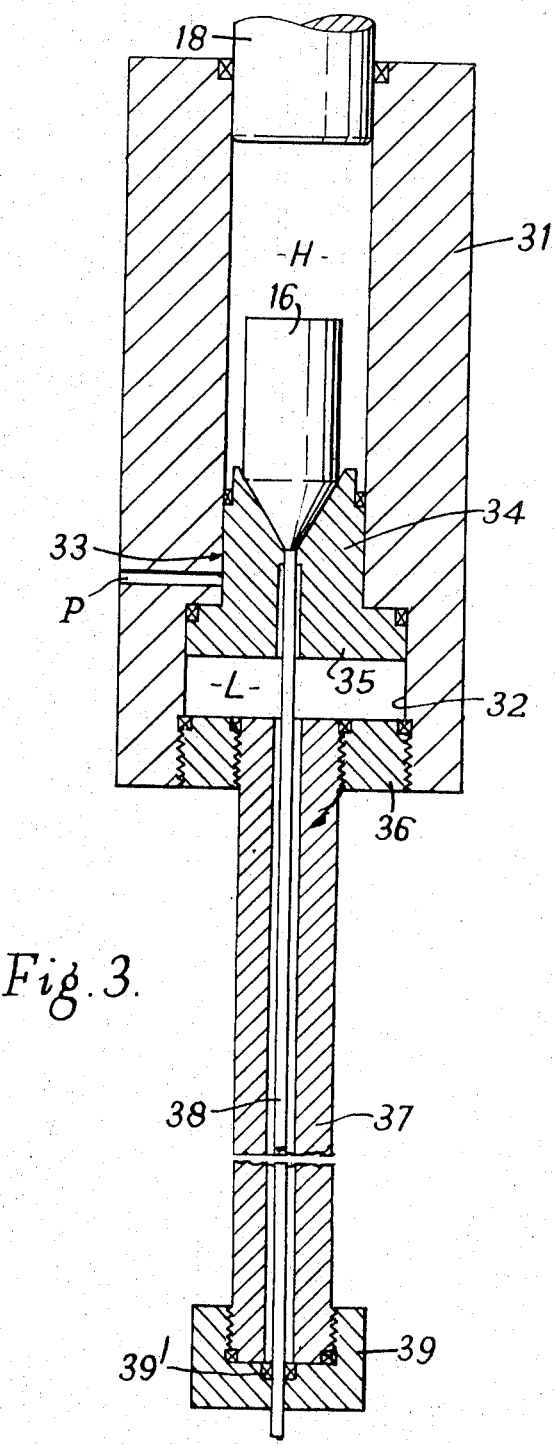
FIG. 3 is a view corresponding to FIG. 1 of a further modified extrusion apparatus in which the billet is extruded against a back pressure.

In the apparatus shown in FIG. 3, the billet 16 is of a comparatively brittle material and must therefore be extruded against a back pressure to prevent fracture of the material as it is extruded. The apparatus comprises a cylindrical wall 31 in one end of which the plunger 18 is slidably mounted. Towards its other end, the bore in the cylindrical wall 31 is stepped to provide a bore 32 of diameter larger than that of the plunger 18. A moveable die member 33 in the form of a stepped piston has a smaller diameter portion 34 which closes the opposite end of a high pressure chamber H bounded by the cylindrical wall 31 and plunger 18 and a larger diameter portion 35 which is slidable in the bore 32.

The outer end of the bore 32 is threaded to receive an end closure consisting of an annular end member 36 into which is threaded a thick walled tube 37 of sufficient length to accommodate the full length of the extrusion 38 formed from the billet 16. The other end of the tube 37 is closed by a cap 39 screwed on to it. For use with the process described in the aforesaid application the cap 39 may be formed with an aperture to permit the passage of the extrusion 38 through it, in which case a seal 39' is mounted in the cap 39 to be a close sliding fit on the extrusion 38. In this case, the tube 37 can be shortened and the extrusion 38 may pass directly to a further extrusion or other working stage. A clamping device is then mounted in the plunger 18.

The ratio of the areas of the cross section of the smaller diameter portion 34 of the moveable member 33 and the end of the larger diameter portion 35 facing the end member 36 is chosen such that a suitable back pressure is generated in the chamber L to prevent cracking or fracture of the extrudate when the pressure in the chamber H is high enough to cause extrusion of the billet 16.

Where the end cap 39 does not permit the passage of the extrusion 38 through it, the permitted range of movement of the moveable member 33 must be such as to permit the latter to move towards the plunger 18 so as to increase the volume of the chamber L to accommodate the increasing volume of the extrusion 38.

Figure 4:
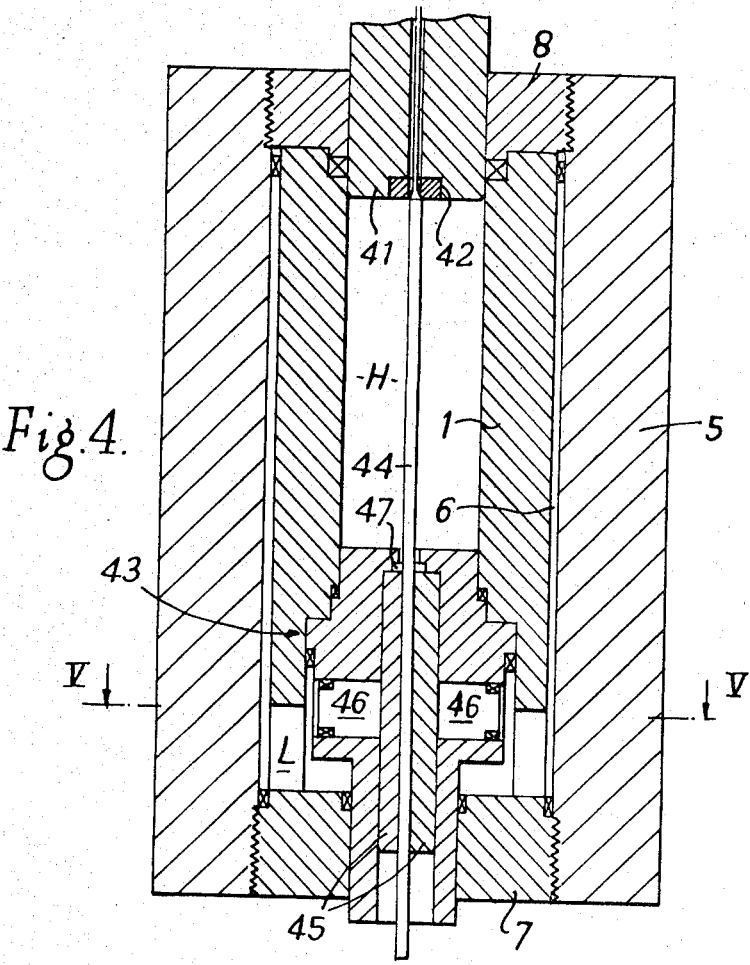
FIG. 4 is an axial sectional view of a cyclical extrusion apparatus of the kind described in our co-pending application referred to above.
Figure 5:
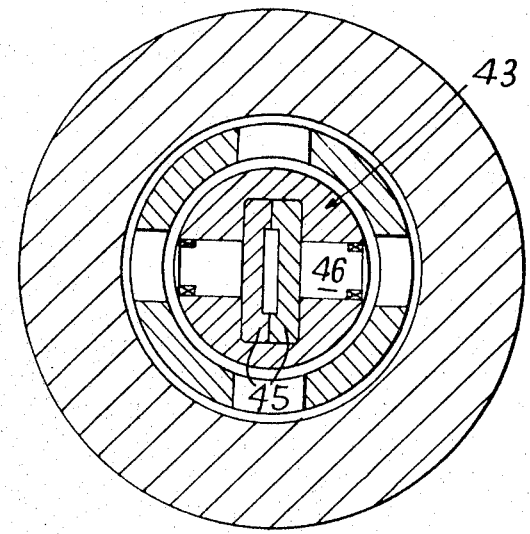
FIG. 5 is a cross sectional view on the line V—V of FIG. 4.

The apparatus shown in FIGS. 4 and 5 is one example of an adaptation of the apparatus shown in FIG. 1 for semi-continuous hydrostatic extrusion of a continuous billet as described in our co-pending application referred to above. Components which may be identical to those shown in FIG. 1 are indicated by the same reference numerals.

The plunger 41 is hollow and carries an extrusion die 42 inset in its end. The moveable member 9 of FIG. 1 is replaced by a corresponding moveable member assembly 43 which is hollow to permit the passage of the billet 44 through it and its interior contains a pair of clamping jaws 45 which can be forced into clamping contact with the billet 44 by means of two plungers 46 slidably mounted in transverse bores in the moveable member assembly 43.

When the plunger 41 is forced into the cylindrical wall 1, the moveable member assembly 43 generates a pressure in the chamber L and the clearance 6 which is a constant fraction of the pressure in the chamber H as described above. This pressure in the chamber L acts on the plungers 46 which in turn forces the clamping jaws 45 into frictional contact with the billet 44 thus clamping it to the moveable member assembly 43. Further movement of the plunger 41 increases the pressure in the chamber H until the billet 44 is hydrostatically extruded through the die 42. At the same time the clamping pressure on the billet 44 is proportionately increased. After the plunger 41 has completed its stroke it is withdrawn to its original position. As soon as the pressure in the chamber H is reduced, the pressure in the chamber L drops correspondingly and the clamping jaws 45 are released from the billet. A further length of billet 44 can then be drawn into the chamber H with the plunger 41 as it withdraws. The cycle can then be repeated until the entire length of the billet 44 has been extruded through the die 41.

A high pressure seal 47 which is a close sliding fit on the billet 44 is located in an appropriate position in the moveable member assembly 43 to prevent escape of high pressure liquid from the chamber H.

FIGS. 6 and 7 show a modified cyclical hydrostatic extrusion apparatus in which the means for clamping the billet against back-extrusion which is operated by the high hydrostatic pressure which causes the extrusion itself. In its simplest form, the apparatus comprises a cylindrical wall 61 which may be supported or reinforced by any of the means described above. A plunger 62 is slidable in one end of the bore within the wall 61 while the other end of the bore is threaded to receive a closure member 63.

The closure member 63 is formed with an extension 64 formed with a transverse bore which is stepped so that the radially outer portion 65 of the bore is of larger diameter than the radially inner portion 66. A correspondingly stepped plunger 67 is slidably mounted in each half of the bore, the length of the larger diameter portions of the plungers being less than the length of the corresponding portions of the bores so that an annular space 68 is left between the stepped portions of the plungers and the bores. The plungers serve to apply clamping jaws 69 against the billet 70 to be extruded. Each end of each plunger 67 carries a high pressure seal, the larger diameter seals being indicated at 71 and the smaller diameter seals at 72.

During an operating cycle, the pressure in the annular space 68 will be much less than that in the chamber H. There will accordingly be an out of balance force acting on the plungers 67 which will force the jaws 69 into clamping contact with the billet 70. This arrangement is in effect one application of Bridgman's unsupported area principle.

As in the case of the apparatus shown in FIGS. 4 and 5, the plunger 62 is hollow and carries an extrusion die 73.

Obviously in the embodiments shown in FIGS. 4 and 5 and 6 and 7 more than one pair of plungers for operating the jaws may be employed. Moreover, it will be noted that the constructions shown in FIGS. 1 to 3 may be adapted for cyclically hydrostatic extrusion by the addition of appropriate clamping means which may be of the type shown in FIGS. 4 to 7 or may for example be of the type shown in our co-pending application referred to above.

It will be noted that in all the embodiments of the various aspects of the invention shown in FIGS. 2 to 7, high pressure seals are mounted between all adjacent members subjected to hydrostatic pressure. Furthermore, where relative movement is required between adjacent members, the seals must of course be of a type which provide sealed sliding contact.

Obviously various combinations of FIGS. 1 to 7 can be employed. For example the end member 63 in FIG. 6 can be used in the role assigned to part 10 in FIG. 1 or to part 23 in FIG. 2. In such cases the die would be mounted in the plunger 18 or 17. Also part 35 of FIG. 3 can be used to develop pressure between the inner and outer numbers 1 and 5 as part 10 does in FIG. 1 or part 23 in FIG. 2. Furthermore the clamping arrangement shown on FIG. 4 can be used in conjunction with that of FIG. 2 when the part 23 of FIG. 2 would accommodate the sliding plunger 46 of FIG. 4.

In the embodiments shown in FIGS. 1 to 7, the end members are shown as being screwed into the ends of the cylindrical walls. In some cases, the cyclical axial tensile stresses in the region of the screw threads might be sufficiently high to cause failure by fatigue. In such cases, the end members may instead be retained in position by a set of longitudinal tie rods mounted in a ring around the container structure and serving to clamp the two end members of the container structure. The tie rods themselves may be pre-tensioned to reduce the risk of fatigue failure.

Referring again to the apparatus shown in FIG. 1, typical values for the hydrostatic extrusion process for the various pressures suitable for alloy steel components would be $p_i = 220$ ton/in.² (cyclically varying)
$p_o = 137.5$ ton/in.² (cyclically varying)
$p_f = 80$ ton/in.² (constant)

The cyclic compressive hoop stress in the bore of the extrusion die will approximate 275 ton/in.² for large K ratios for the die, which is below the yield stress of tungsten carbide, for example, at least in small cross sections. Under these circumstances the cylindrical wall 1 could be made of an alloy steel capable of withstanding a cyclic compressive stress of 220 ton/in.², the outer wall 5 a cyclic compressive stress of (typically) 150 ton/in.², and the further wall 20 a static tensile stress of (typically) 133 ton/in.² for which comparatively conventional constructional methods or those described in our copending application referred to above can be used if preferred.

One advantage of this method of construction is that by eliminating all tensile stresses from the liner, the liner itself can be fashioned into a form suitable for use as an electrical resistance heater, by using composite ceramic/metallic components to provide a suitable electrical heating element. The process inside the liner for example hydrostatic extrusion, can then be carried out at high temperature. There seems to be virtually no limit on the internal pressure which could be allowed, provided the material of the liner has the necessary compressive strength to withstand it.

According to a further aspect of the present invention, an aperture through which a length of billet extends through a wall of a container, the interior of which is subjected to a high hydrostatic pressure, for example for extrusion of the billet, is provided with sealing means comprising a chamber surrounding the path of the billet through the aperture and means for supplying a viscous material such as grease to fill the chamber, the arrangement being such that when the pressure within the container rises to its high value, the viscous material effectively solidifies in contact with the billet to prevent the escape of high pressure liquid from the container.

The axial length of the chamber filled with viscous material is preferably made sufficiently great for the viscous material, when effectively solidified under high pressure, to clamp the billet against back extrusion through the aperture, thereby avoiding the need for any other mechanical clamp for this purpose. Advantageously the chamber is replenished through a suitable passage with further viscous material to replace any which is lost during a cyclical variation in working pressure.

Figure 8:
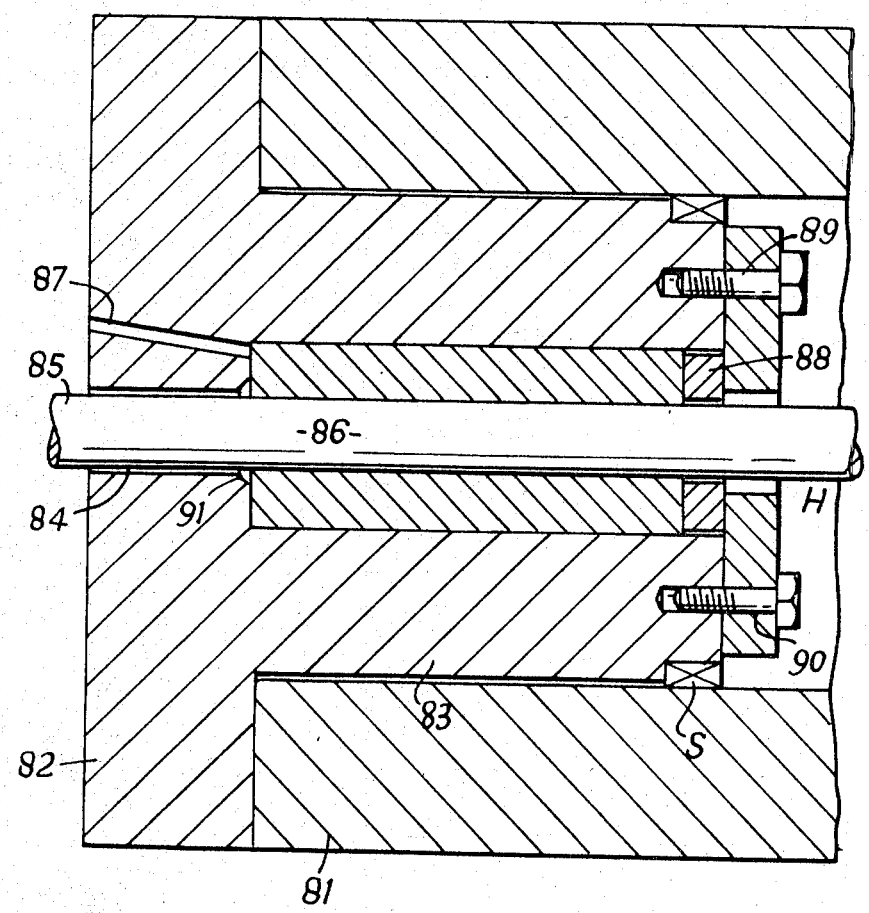
FIG. 8 is an axial sectional view of sealing means for a billet.

An embodiment of this aspect of the invention is shown by way of example in FIG. 8 in which the cylindrical wall 81 is closed at one end by a member 82 having a cylindrical spigot portion 83 extending into the end of the cylindrical wall 81. The end member 82 is formed with an axial aperture 84 through which a length 85 of billet can extend from the outside into the interior of the high pressure chamber H within the cylindrical wall 81.

The portion of the aperture 84 within the spigot 83 is of enlarged diameter to form a sealing and clamping chamber 86 which can be supplied with a viscous material such as grease through a replenishment passage 87 closed by a non-return valve (not shown).

The inner end of the chamber 86 is closed by a metal ring 88 through which the billet 85 can freely slide, the ring 88 being retained in the chamber 86 by a retaining ring 89 bolted to the end face of the spigot 83 by bolts 90. A static high pressure seal S prevents the loss of high pressure fluid between the wall 81 and the spigot 83.

The clamping and sealing device shown in FIG. 8 may be used in the cyclical hydrostatic extrusion of a billet as described in our co-pending application referred to above. Thus, when the pressure in the chamber H is zero, a length of billet 85 can be fed through the aperture 84 into the chamber H. The chamber 86 may then be replenished with viscous material and the pressure in the chamber H is then raised to a sufficiently high value to cause the extrusion of the billet through a die (not shown). This high pressure acts on the ring 88 which forces the viscous material into high pressure contact with the whole of the length of the billet 85 lying within the chamber 86. As the pressure in the chamber H rises, the viscous material effectively solidifies thus clamping the billet 85 firmly in the end member 82 and at the same time sealing the aperture 84 against loss of high pressure fluid from the chamber H.

After a length of the billet 85 has been extruded the pressure in the chamber H is again reduced to zero and a further cycle takes place. The ring 88 serves particularly to separate the fluid in the chamber H from the grease in the chamber 86 to reduce mixing of these two substances.

The sealing and clamping device shown in FIG. 8 has a very long working life since the clamping material itself is readily replenished at each cycle and forms its own seal, thus avoiding the wear which might occur with a mechanical seal capable of withstanding the high peak pressure within the chamber H. Obviously, the viscous material can conform to irregularities in the surface of the billet 85.

In order to prevent extrusion of the viscous material from the chamber 86 through the clearance around the billet 85 in the aperture 84, while the pressure in the chamber H is rising but before this pressure reaches sufficient value to cause effective solidification of the viscous material, this clearance may be sealed by a tapered annular seal 91 which may be resilient for example a metal ring formed with slits. The rise of pressure in the material in the chamber 86 will then force the seal 91 to the left in FIG. 8 and thus into sealing contact with its inclined seat in the end member 82 which in turn will urge it into sealing contact with the billet 85. The resilience of the seal 91 will enable it to accommodate a satisfactory range of tolerance in the diameters and surface shape of the billet 85.

If desired, solid inserts, for example with roughened surfaces, may be located within the chamber 86 to act as baffles in reducing the loss of viscous material through the aperture 84, particularly where no seal 91 is used, and/or to replace the viscous material when solidified by the high pressure in the chamber H. If desired, additional mechanical clamping means may be used to assist in clamping the billet 85 against back extrusion.

Under some conditions, it may be possible to replace the body of viscous material by an elastomeric body, for example of an appropriate rubber, which would then fill the chamber 86. Alternatively, an annular body of elastomeric material may be mounted in an annular chamber in place of the tapered seal 91, the arrangement being such that while the pressure in the chamber H is building up, the tendency for the viscous material to exude from the chamber 86 causes the elastomeric body to deform into contact with the billet to prevent any loss of viscous material while the latter is at a pressure below that required to solidify it.

In all the embodiments described above and illustrated in the drawings, the connection between the various elements of composite parts are described as being effected by means of screw threads. For many applications, it is necessary that these elements are made of very hard materials which tend to be somewhat brittle and liable to fatigue failure under the cyclic pressure conditions. In practice therefore it may be preferable to employ other methods of connection. For example the end walls of the cylindrical chamber may be secured by means of tie bars interconnecting clamping rings at each end of the container. Such tie bars may be made of materials appropriately high tensile strength and there is then no objection to forming them as screw threaded tie-bolts. Similarly where, as in FIG. 2, the movable member is formed of two or more elements, these may be secured together by providing them with appropriate flanges to be engaged by clamping rings and high tensile clamping bolts.

Instead of generating the high pressure in the chamber H directly, the lower pressure in the chamber L may be generated by an appropriate plunger, in which case the movable member acts as an intensifier to generate the high pressure in the chamber H.

In the apparatus shown in FIG. 3, the pressure in the chamber L may also be applied to the exterior of the container 31 as in the case of the embodiments shown in FIGS. 1 and 2.

We claim:
1. A high pressure container structure for cyclically varying pressures comprising:
members together defining a thick-walled inner container, one of said members forming a movable pressurizing plunger for varying the volume within said inner container, another member being a movable member which floats independently of said pressurizing plunger to vary the volume within said inner container,
said floating member presenting a first surface to the interior of said inner container, and an outer container around said inner container, said floating movable member presenting a second surface to the interior of said outer container, said second surface having a greater effective area than said first surface, said second surface being on the opposite side of said floating movable member to said first surface,
said floating movable member thus determining a pressure ratio between the interior of said inner and outer containers, said outer container pressure being proportional to but less than said inner container pressure throughout a working cycle, said outer container pressure serving to at least materially reduce tensile hoop stresses in said inner container.

2. A high pressure container according to claim 1, in which said inner container has a cylindrical wall and the thickness of said cylindrical wall is at least one half of the internal radius of said wall.

3. A high pressure container according to claim 1, in which said inner container has a cylindrical wall and the ratio $$p_o : p_i > \tfrac{1}{2}\left(1 + \frac{1}{K'^2}\right)$$

where K is the ratio of the outer radius to the inner radius of the wall, $p_o$ is the pressure in the outer container interior at any instant during a cycle and $p_i$ is the pressure within the inner container.

4. A high pressure container according to claim 1, in which the outer container is itself surrounded by a further chamber having means for maintaining a substantially constant pressure sufficiently high in order to ensure that there are substantially no tensile hoop stresses in said outer container.

5. A high pressure container structure according to claim 4, in which the said outer container has a cylindrical wall and the ratio of the pressure in the said further chamber to the peak pressure in the said outer chamber is not less than one half $$\left(1 + \frac{1}{K^2}\right)$$

where $K^2$ is the ratio of the outer to the inner radius of said cylindrical outer container wall.

6. A high pressure container structure according to claim 1, in which the floating movable member is in the form of a differential piston working in a stepped bore in the inner container, the larger working face of the piston being in communication with the interior of said outer chamber.

7. A high pressure container structure according to claim 1, in which the floating movable member defines an end wall portion and a cylindrical side wall portion of the inner container and a plunger extends into the other end of said cylindrical side wall of said inner container, said cylindrical side wall being slidably mounted with one annular end face portion exposed to the interior of said outer chamber.

8. A high pressure container according to claim 1, in which said second surface of said floating movable member is spaced from said first surface of said floating movable member in the direction in which said floating movable member is urged by high pressure in said inner chamber.

References Cited
UNITED STATES PATENTS

| | | | |
|---|---|---|---|
| 667,525 | 2/1901 | Huber | 72—60 |
| 3,282,459 | 11/1966 | Wilson | 220—3 |
| 3,379,043 | 4/1968 | Fuchs, Jr. | 72—56 |

RICHARD J. HERBST, Primary Examiner

U.S. Cl. X.R.
72—710; 92—80